United States Patent [19]
Shichijyo et al.

[11] Patent Number: 5,455,500
[45] Date of Patent: Oct. 3, 1995

[54] ALTERNATING CURRENT GENERATOR FOR VEHICLES

[75] Inventors: Akiya Shichijyo, Aichi; Shin Kusase, Obu, both of Japan

[73] Assignee: Nippondenso Co., Ltd., Kariya, Japan

[21] Appl. No.: 159,921

[22] Filed: Dec. 1, 1993

[30] Foreign Application Priority Data

Dec. 2, 1992 [JP] Japan .................................. 4-323080

[51] Int. Cl.⁶ ................................................. H02K 11/00
[52] U.S. Cl. ............................ 322/90; 322/58; 318/771; 310/198
[58] Field of Search ............................. 322/89, 90, 91, 322/58, 99; 318/771; 310/198

[56] References Cited

U.S. PATENT DOCUMENTS

| | | | |
|---|---|---|---|
| 4,163,187 | 7/1979 | Thomas | 322/29 |
| 4,701,692 | 10/1987 | Takeuchi et al. | 322/90 |
| 4,973,896 | 11/1990 | Shiga et al. | 322/28 |
| 5,274,322 | 12/1993 | Hayashi et al. | 322/90 |

FOREIGN PATENT DOCUMENTS

| | | |
|---|---|---|
| 426345 | 1/1992 | Japan . |
| 4-42759 | 2/1992 | Japan . |

Primary Examiner—Kristine L. Kincaid
Assistant Examiner—Nicholas Ponomarenko
Attorney, Agent, or Firm—Cushman, Darby & Cushman

[57] ABSTRACT

An alternating current generator having a first Y-form three-phase connecting circuit including three first windings connected with each other in a Y-form, a first rectifying circuit for rectifying currents output from output terminals of the three first windings, a second Y-form three-phase connecting circuit including three second windings connected with each other in a Y-form, and a second rectifying circuit for rectifying currents outputted from output terminals of the three second windings. The three first windings are inserted in slots of a stator core so that the three first windings have phase differences of approximately 120 degrees from each other. Each of the three second windings is divided into first and second winding portions which are inserted in separate slots of the stator core, in which the three first windings are inserted so that resultant output vectors of the respective two divided windings have respective phase differences of approximately 30 degrees with respect to output vectors of the respective three first windings. By virtue of the above-mentioned structure, the number of slots in the stator core is reduced, the ripple contained in a resultant output waveform is decreased by adding together output currents of the first and second rectifying circuits, respectively, and heat generation due to a circulating current flowing in the connecting circuits can be prevented by avoiding the use of a delta-form three-phase connecting circuit.

4 Claims, 2 Drawing Sheets

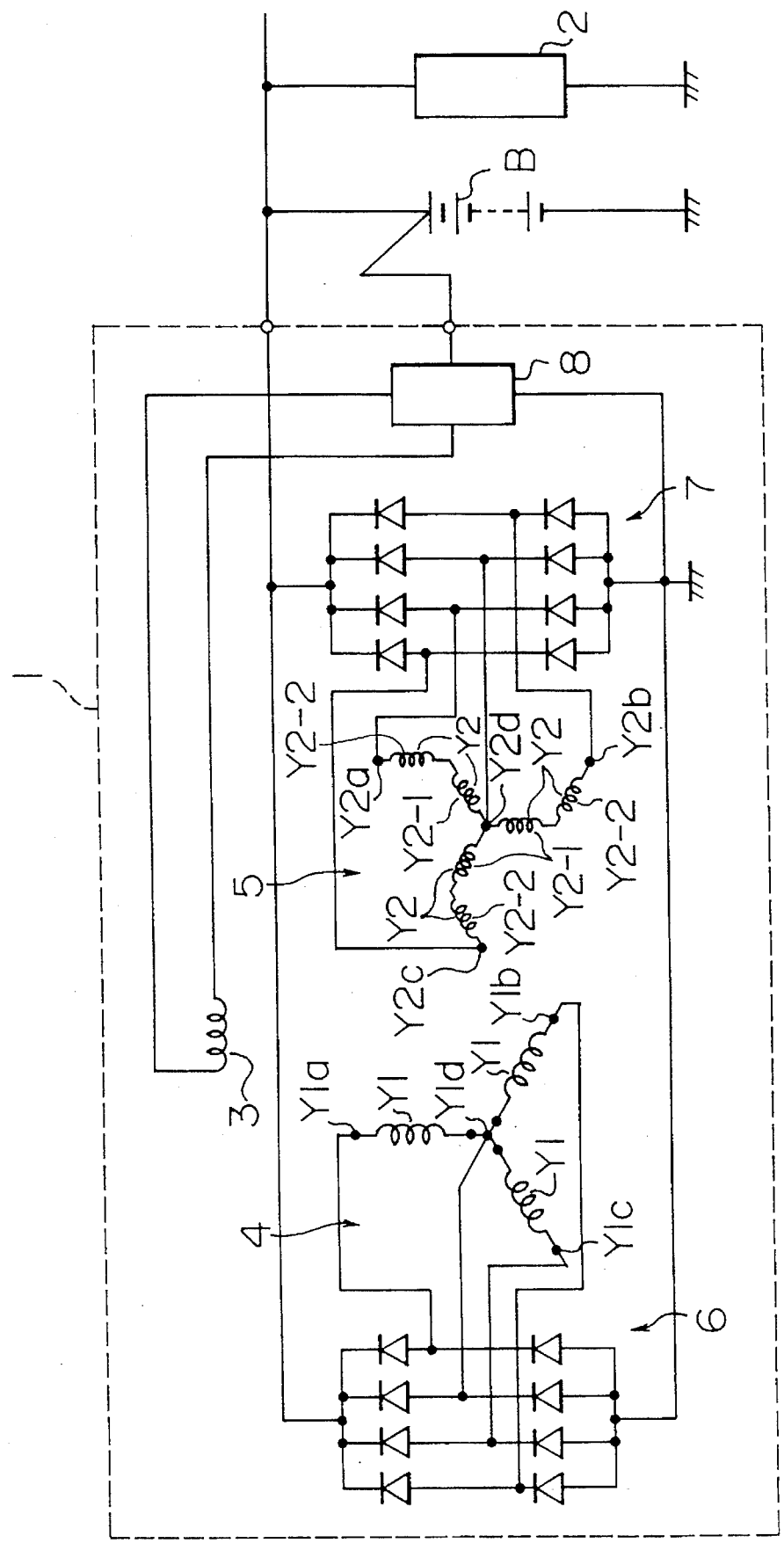
FIG. I

ALTERNATING CURRENT GENERATOR FOR VEHICLES

BACKGROUND OF THE INVENTION

The present invention relates to an alternating current generator, and in particular, to an alternating current generator having two sets of connecting circuits for use in a vehicle.

Alternating current generators such as those disclosed in JP-A-4-26345 and JP-A-4-42759 are known.

JP-A-4-26345 discloses an alternating current generator having two sets of Y-form three-phase connecting circuits. The windings in a first set of two sets of Y-form three-phase connecting circuits are inserted in slots of a stator core and the windings in the second set of Y-form three-phase connecting circuits are inserted in slots of the stator core and are respectively arranged between the former slots so that the output vectors of the windings of the first set of Y-form three-phase connecting circuit have respective phase differences of 30 degrees with respect to the vectors of outputs of the windings of the second set of Y-form three-phase connecting circuits. The ripple of a combined output signal therefrom is decreased in this prior art device.

However, it is necessary to use a stator core provided with a great many slots, because two slots are necessary per phase and per pole.

As a result, the winding of the stator becomes complicated and the width of the core teeth of the stator core is halved, so that the core teeth are likely to deform during the winding process or the stator core assembling process.

In view of the above-described circumstances, the prior art disclosed in JP-A-4-42759 was devised to cope with the disadvantage of the prior art disclosed in the above mentioned JP-A-4-26345 by providing an alternating current generator including a first set of Y-form three-phase connecting circuit and a second set of delta-form three-phase connecting circuit. The windings of both of the Y-form and delta-form three-phase connecting circuits are inserted in the same slots so that the outputs vectors of the windings of the Y-form three-phase connecting circuit have respective phase differences of 30 degrees with respect to the vectors of outputs of the windings of the delta-form three-phase connecting circuit.

However, the prior art disclosed in JP-A-4-42759 has a disadvantage in that because one of the winding circuits is a delta-form three-phase connecting circuit, a circulating current flows through the delta-form three-phase connecting circuit, which generates undesirable heat.

SUMMARY OF THE INVENTION

The present invention was made in view of the above-mentioned circumstances, and it is an object of the present invention to suppress the ripple contained in the rectified direct current output and to increase the output quantity without increasing the number of slots, and to attain this object without using a delta-form three-phase connecting circuit.

In the alternating current generator according to the present invention, the following technical structure was adopted.

The alternating current generator of the present invention comprises a first Y-form three-phase connecting circuit having three first windings connected with each other in Y-form, a first rectifying circuit for rectifying current outputs from respective terminals of the three first windings, a second Y-form three-phase connecting circuit having three second windings connected with each other in Y-form, and a second rectifying circuit for rectifying current outputs from respective terminals of the three second windings. The three first windings are inserted in slots of a stator core so that the three first windings are arranged respectively to have phase differences of approximately 120 degrees therebetween. Each of the three second windings is divided into two windings. The respective divided windings are separately inserted in respective slots in which the first windings are inserted so that resultant vectors of the respective pairs of divided windings have phase differences of approximately 30 degrees with respect to the vectors of the first windings, respectively.

In the alternating current generator of the present invention, even if the respective divided second windings of the second Y-form three-phase connecting circuit are inserted in slots in which the first windings of the first Y-form three-phase connecting circuit are inserted, it is possible to make the resultant vectors of the respective divided second windings have phase differences of approximately 30 degrees with respect to the vectors of the first windings, respectively. That is, though the second windings are divided and inserted in the same slots with the first windings, a magnetomotive force change of the second windings can be made to have a phase difference of approximately 30 degrees with respect to a magnetomotive force change of the first windings.

This causes the maximum value point of an output waveform of the second rectifying circuit to corresponded to the minimum value point of an output waveform of the first rectifying circuit, and, conversely, the minimum value point of the output waveform of the second rectifying circuit to correspond to the maximum value point of the output waveform of the first rectifying circuit. Accordingly, a difference between the minimum and maximum values of a resultant output of the first and second rectifying circuits is decreased as compared with respective differences between the minimum values and maximum values of the outputs of the first and second rectifying circuits, respectively, and, as a result, the ripple contained in the resultant output is decreased.

Each of the first and second Y-form three-phase connecting circuits has three windings connected with each other in a Y-form. Accordingly, it is possible to prevent the generation of heat from being caused by a circulating current flowing through a delta-form three-phase connecting circuit.

The alternating current generator of the present invention has the following advantages.

First, the alternating current generator of the present invention is capable of suppressing the ripple contained in the resultant output of the first and second rectifying circuits by providing a phase difference of approximately 30 degrees between the vector of each of the first windings and the resultant vector of each of the second windings, as mentioned above.

Second, each of the second windings are divided into two windings, which are then separately inserted in the slots of a stator core in which the first windings are inserted. Accordingly, as compared with the prior art in which two Y-form three-phase connection windings are inserted in individual slots, respectively, to thereby reduce the ripple contained in the output waveform, it is possible for the alternating current generator of the present invention to reduce the number of slots of the stator core.

Third because since the alternating current generator of the present invention can produce an exciting current from both of the first and second Y-form three-phase connecting circuits, it is possible to increase an output of the alternating current generator, as compared with the prior art which uses a combination of a Y-form three phase connecting circuit and a delta-form three phase connecting circuit thereby to reduce the ripple contained in the output waveform.

BRIEF DESCRIPTION OF THE DRAWINGS

FIG. 1 is an electric circuit diagram of a three-phase alternating current generator for vehicles according to the present invention;

DESCRIPTION OF THE PREFERRED EMBODIMENTS

Figure 2A:
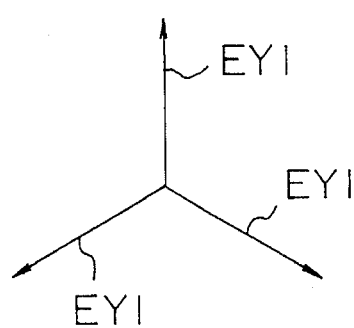
FIGS. 2A and 2B are voltage vector diagrams of the first and second windings.
Figure 2B:
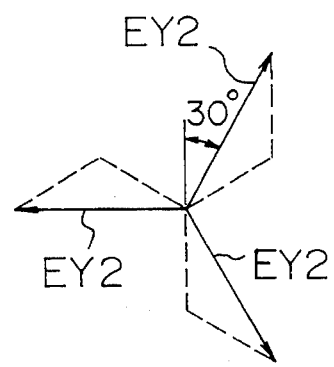

An alternating current generator according to the present invention will be described with respect to an embodiment shown in the drawings.

FIGS. 1 through 4 show an embodiment of the present invention. FIG. 1 is a wiring diagram of a three-phase alternating current generator for vehicles.

The three-phase alternating current generator 1 is adapted to supply generated electric power to a battery B and an electric load 2 of a vehicle, and it comprises a field coil 3, which is driven to rotate by a vehicle driving engine (not shown) and generates a rotating magnetic field, two sets of connecting circuits 4 and 5, two sets of rectifying circuits 6 and 7, a regulator 8, etc.

One of the two sets of connecting circuits 4 and 5 is a first Y-form three-phase connecting circuit 4 having three first windings Y1 connected in Y-form, and the other thereof is a second Y-form three-phase connecting circuit 5 having three second windings Y2 connected in Y-form. One of the two sets of rectifying circuits 6 and 7 is a first rectifying circuit 6 comprising eight diodes which rectify output currents supplied from respective terminals Y1a, Y1b and Y1c of the three first windings Y1 of the first Y-form three-phase connecting circuit 4 and a neutral point Y1d which is a common connection point of the three first windings Y1. The other of the two sets of rectifying circuits 6 and 7 is a second rectifying circuit 7 comprising eight diodes which rectify current outputs supplied from respective terminals Y2a, Y2b and Y2c of the three second windings Y2 of the second Y-form three-phase connecting circuit 5 and a neutral point Y2d which is a common connection point of the three second windings Y2.

Each of the three second windings Y2 of in the second Y-form three-phase connecting circuit 5 is divided into two winding portions. In other words, each of three second windings Y2 is divided into two winding portions of Y2-1 and Y2-2.

On the other hand, the three-phase alternating current generator 1 includes a stator core (not shown) fixed to a housing (not shown). The stator core has 36 slots (one slot per pole per phase, which slots are not shown) disposed along the entire inner periphery thereof in which slots both of the first and second windings Y1 and Y2 of the first and second Y-form three-phase connecting circuits 4 and 5 are inserted, respectively.

The three first windings Y1 of the first Y-form three-phase connecting circuit 4 are sequentially inserted in 36 slots formed in the stator core so that the three first windings have phase differences of 120 degrees therebetween.

On the other hand, the respective divided windings Y2-1 and Y2-2 of the three second windings Y2 are separately inserted in the same slots as those of the three first windings Y1 so that resultant vectors EY2 (refer to the voltage vector diagram shown in FIG. 2B) of the respectively divided windings Y2-1 and Y2-2 have phase differences of 30 degrees with respect to the vectors EY1 (refer to the voltage vector diagram shown in FIG. 2A) of the three first windings Y1, respectively.

Next, the operation of the foregoing embodiment will be briefly described.

Figure 3:
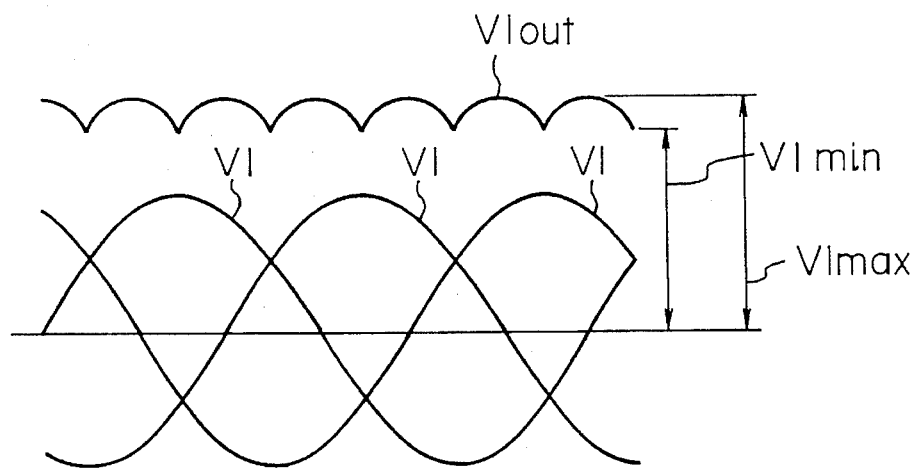
FIG. 3 is a waveform diagram showing the output waveform of a first Y-form three-phase connecting circuit.

When the three-phase alternating current generator 1 is driven by the engine to rotate, a magnetic flux, which is generated by the field coil 3, is rotated inside the stator core. The output waveforms V1 of the three first windings Y1 of the first Y-form three-phase connecting circuit 4 are sinusoidal waveforms having phase differences of 120° therebetween, respectively, as shown in FIG. 3. Accordingly, the output waveform V1out of the first rectifying circuit 6 shows a large difference between its maximum voltage V1max and its minimum voltage V1min, as illustrated in FIG. 3.

Figure 4:
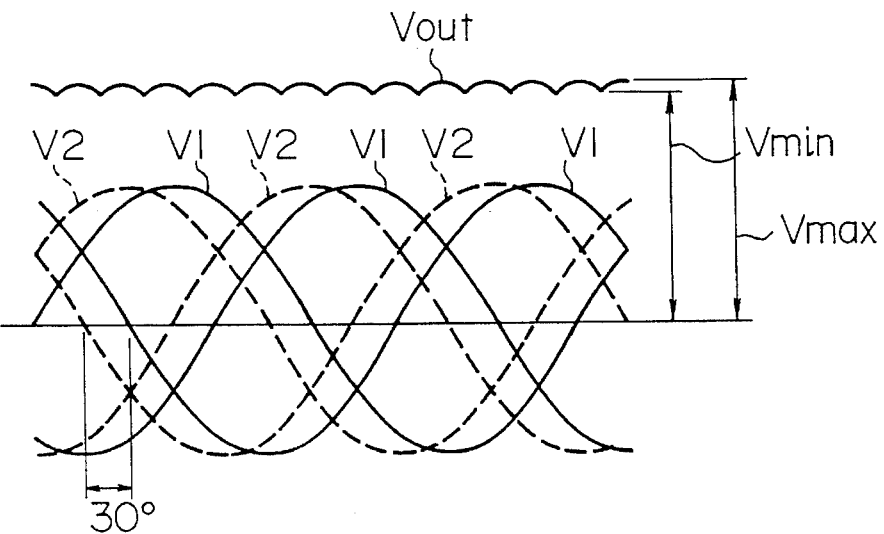
FIG. 4 is a waveform diagram showing the output waveform of a first and a second Y-form three-phase connecting circuits.

On the other hand, the output waveforms V2 of the three second windings Y2 of the second Y-form three-phase connecting circuit 5 are sinusoidal waveforms having phase differences of 120° therebetween, respectively, as shown in FIG. 4, and the output waveforms V2 of the three second winding Y2 have phase differences of 30 degrees with respect to the output waveforms V1 of the three first windings Y1, respectively.

Thus, the maximum value of the output waveform of the second rectifying circuit 7 corresponds to the minimum value of the output waveform of the first rectifying circuit 6. Conversely, the minimum value of the output waveform of the second rectifying circuit 7 corresponds to the maximum value of the output waveform of the first rectifying circuit 6. As a result, a difference between the maximum value Vmax and the minimum value Vmin of the resultant composite output waveform Vout of the first and second rectifying circuits 6 and 7 is decreased as compared with differences between the maximum values and the minimum values of the respective output waveforms of the first rectifying circuit 6 and the second rectifying circuit 7. As a result, the ripple contained in the output waveform of the three-phase alternating current generator 1 is decreased. It is also possible to use an arrangement in which an exciter current is not produced from a neutral point of the common connection point of each of the three first and second windings Y1 and Y2, respectively.

With the three-phase alternating current generator 1 of the present embodiment, it is possible to reduce the ripple contained in the resultant output waveform of the first and second rectifying circuits 6 and 7 of the three-phase alternating current generator 1 of the present embodiment, by making the resultant vectors of the respectively divided second windings Y2-1 and Y2-2 have phase differences of 30 degrees with respect to the vectors of the first windings Y1, respectively.

Each of the second windings Y2 is divided into two windings which are separately inserted in different slots in which the first windings Y1 are inserted. Accordingly, the number of slots formed in the stator core may be made equal to that of the slots in the case of a conventional Y-form three-phase connecting circuit. Since the above structure can be realized without using any delta-form three-phase connecting circuit, a problem of heat generation due to the use of the delta-form connecting circuit can be avoided.

Further, exciter currents are produced from the neutral points of the first windings Y1 and the second windings Y2 in the first and second Y-form three-phase connecting circuits 4 and 5, respectively, and are rectified through the first and second rectifying circuits 6 and 7, respectively.

Therefore, the present invention makes it possible to increase the output of the three-phase alternating current generator 1, as compared with the prior art which contemplates to reduce the ripple contained in the output waveform by using a combination of a conventional Y-form three-phase connecting circuit and a conventional delta-form three-phase connecting circuit.

We claim:

1. An alternating current generator comprising:
    a stator core having a plurality of slots defined therein;
    a first Y-form three-phase connecting circuit including three first windings connected with each other to have a Y-form, each of said three first windings having an output terminal;
    a first rectifying circuit for rectifying currents output from each output terminal of each of said three first windings;
    a second Y-form three-phase connecting circuit including three second windings connected with each other to have a Y-form, each of said three second windings having an output terminal;
    a second rectifying circuit for rectifying currents output from each output terminal of each of said three second windings;
    said three first windings being inserted in said slots of said stator core so that said three first windings have phase differences of approximately 120 degrees therebetween;
    each of said three second windings including a first winding portion and a second winding portion, said first winding portion and said second winding portion of each of said three second windings being inserted in separate slots of said stator core in which said three first windings are inserted so that a resultant output vector of each of said three second windings, including said first winding portion and said second winding portion, has a respective phase difference of approximately 30 degrees with respect to an output vector of a respective one of said three first windings.

2. An alternating current generator according to claim 1, wherein said first rectifying circuit also rectifies a current output from a neutral point, which is a common connection point of said three first windings, in addition to currents output from said output terminals of said three first windings, and
    said second rectifying circuit also rectifies a current output from a neutral point, which is a common connection point of said three second windings, in addition to currents output from said output terminals of said three second windings.

3. An alternating current generator according to claim 1, wherein respective outputs of said first and second rectifying circuits are added together.

4. An alternating current generator according to claim 2, wherein respective outputs of said first and second rectifying circuits are added together.

* * * * *